US009633613B2

(12) United States Patent
Li et al.

(10) Patent No.: US 9,633,613 B2
(45) Date of Patent: Apr. 25, 2017

(54) METHOD OF SUB-PIXEL COMPENSATION COLORING OF RGBW DISPLAY DEVICE BASED ON EDGE PIXEL DETECTION

(71) Applicant: Shenzhen China Star Optoelectronics Technology Co., Ltd., Shenzhen, Guangdong (CN)

(72) Inventors: Hao Li, Guangdong (CN); Houliang Hu, Guangdong (CN); Yufeng Jin, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 158 days.

(21) Appl. No.: 14/425,051

(22) PCT Filed: Jan. 16, 2015

(86) PCT No.: PCT/CN2015/070854
§ 371 (c)(1),
(2) Date: Mar. 1, 2015

(87) PCT Pub. No.: WO2016/106865
PCT Pub. Date: Jul. 7, 2016

(65) Prior Publication Data

US 2016/0343312 A1 Nov. 24, 2016

(30) Foreign Application Priority Data

Dec. 31, 2014 (CN) .......................... 2014 1 0854620

(51) Int. Cl.
*G09G 5/02* (2006.01)
*G09G 3/20* (2006.01)
(Continued)

(52) U.S. Cl.
CPC ............ *G09G 3/3607* (2013.01); *G09G 3/36* (2013.01); *G09G 5/02* (2013.01);
(Continued)

(58) Field of Classification Search
CPC combination set(s) only.
See application file for complete search history.

(56) References Cited

U.S. PATENT DOCUMENTS

2010/0149204 A1* 6/2010 Han ......................... G09G 5/02 345/589
2011/0050918 A1* 3/2011 Tachi ..................... H04N 5/217 348/208.4

(Continued)

*Primary Examiner* — Wesner Sajous
(74) *Attorney, Agent, or Firm* — Andrew C. Cheng

(57) ABSTRACT

The invention provides a method of sub-pixel compensation coloring of a RGBW display device based on edge pixel detection, including: receiving m sets of high-resolution RGB data; converting the m sets of high-resolution RGB data into m sets of RGBW data, RG sub-pixels and BW sub-pixels of the RGBW display device each being corresponding to one set of RGBW data; judging a nine-palace pixel block of the RGBW display device whether contains an edge pixel based on the high-resolution RGB data; if the nine-palace pixel block contains the edge pixel, judging the nine-palace pixel block whether contains a saturation pixel based on the high-resolution RGB data; and if the nine-palace pixel block contains the saturation pixel, using a first filtering method to perform a filtering processing on a center pixel in the nine-palace pixel block based on the RGBW data. The invention can effectively eliminate color aliasing phenomenon.

8 Claims, 3 Drawing Sheets

(51) Int. Cl.

| | |
|---|---|
| ***G09G 3/36*** | (2006.01) |
| ***G09G 3/32*** | (2016.01) |
| ***H04N 1/60*** | (2006.01) |
| ***H04N 9/69*** | (2006.01) |
| ***H04N 9/73*** | (2006.01) |

(52) U.S. Cl.
CPC ................. *G09G 2320/029* (2013.01); *G09G 2320/0242* (2013.01); *G09G 2340/0457* (2013.01); *G09G 2340/06* (2013.01); *G09G 2360/16* (2013.01)

(56) References Cited

U.S. PATENT DOCUMENTS

2013/0216130 A1* 8/2013 Saito ...................... H04N 9/045 382/165
2015/0237236 A1* 8/2015 Elliott .................. G09G 3/2003 345/600

* cited by examiner

METHOD OF SUB-PIXEL COMPENSATION COLORING OF RGBW DISPLAY DEVICE BASED ON EDGE PIXEL DETECTION

TECHNICAL FIELD

The present invention relates to the field of display technology, and particularly to a method of sub-pixel compensation coloring of a RGBW display device based on edge pixel detection.

DESCRIPTION OF RELATED ART

In the field of flat panel display technology, especially the field of liquid crystal display technology, in order to reduce the difficulty of manufacturing process of liquid crystal display device while reducing the production cost, a liquid crystal display device with a low physical resolution usually is used to display an image of high physical resolution and meanwhile the spatial resolution and clarity of displayed image of the liquid crystal display device are required to be ensured.

In the prior art, the two types of technologies of sub-pixel rendering and sub-pixel multiplexing can nicely enhance the spatial resolution of displayed image of the liquid crystal display device. However, the sub-pixel rendering technology would cause the formation of image aliasing when the liquid crystal display device displays high-frequency information, and the sub-pixel multiplexing technology would cause the displayed image of the liquid crystal display device being blurred.

SUMMARY

In order to solve the problem in the prior art, the invention provides a method of sub-pixel compensation coloring of a RGBW display device based on edge pixel detection. RG sub-pixels and BW sub-pixels of the RGBW display device each are corresponding to a set of high-resolution RGB data. The method includes: receiving m sets of high-resolution RGB data; converting the m sets of high-resolution RGB data into m sets of RGBW data, wherein RG sub-pixels and BW sub-pixels of the RGBW display device each are corresponding to one of the m sets of the RGBW data; judging a nine-palace pixel block of the RGBW display device whether contains an edge pixel based on the high-resolution RGB data, wherein each pixel in the nine-palace pixel block comprises the RG sub-pixels or the BW sub-pixels; if the nine-palace pixel block contains the edge pixel, judging the nine-palace pixel block whether contains a saturation pixel based on the high-resolution RGB data; if the nine-palace pixel block contains the saturation pixel, using a first filtering method to perform a filtering processing on a center pixel in the nine-palace pixel block based on the RGBW data.

In an embodiment, if the nine-palace pixel block does not contain the edge pixel, using a minimized error feedback adaptive method to perform a processing on a non-edge pixel of the RGBW display device based on the RGBW data.

In an embodiment, if the nine-palace pixel block does not contain the saturation pixel, using a second filtering method to perform a filtering processing on the center pixel in the nine-palace pixel block based on the RGBW data.

In an embodiment, a method of judging a nine-palace pixel block of the RGBW display device whether contains an edge pixel based on the high-resolution RGB data includes: calculating a matrix luminance of any one pixel in the nine-palace pixel block based on Sobel operators in several directions and the high-resolution RGB data; determining a maximum matrix luminance; judging the maximum matrix luminance whether is greater than a predetermined threshold; if the maximum matrix luminance is greater than the predetermined threshold, a pixel in the nine-palace pixel block corresponding to the maximum matrix luminance is the edge pixel.

In an embodiment, the matrix luminance of any one pixel in the nine-palace pixel block is calculated based on the Sobel operators in several directions and the high-resolution RGB data by using an expression 1 as follows:

$$L_n=S_d*(rgb)$$

where Ln represents a matrix luminance value of an nth pixel in the nine-palace pixel block, Sd represent a Sobel operator in a direction of d, d represents an angle, r represents R data corresponding to the nth pixel in the nine-palace pixel block, g represent G data corresponding to the nth pixel in the nine-palace pixel block, and b represents B data corresponding to the nth pixel in the nine-palace pixel block.

In an embodiment, a method of judging the nine-palace pixel block whether contains a saturation pixel based on the high-resolution RGB data includes: determining a maximum data value and a minimum data value in the RGB data corresponding to any one pixel in the nine-palace pixel block; dividing the maximum data value by the minimum data value to obtain a data ratio; judging the data ratio whether is less than a predetermined threshold; if the data ratio is not less than the predetermined threshold, a pixel in the nine-palace pixel block corresponding to the data ratio is the saturation pixel.

In an embodiment, the first filtering method includes: in the nine-palace pixel block, if the center pixel is the saturation pixel, or a 2nd pixel is the saturation pixel, or a 6th pixel is the saturation pixel, or an 8th pixel is the saturation pixel, or a 4th pixel is the saturation pixel, or the 4th pixel and the 8th pixel each are the saturation pixel, or the 2nd pixel and the 4th pixel each are the saturation pixel, or the center pixel and a 7th pixel each are the saturation pixel, or a 1st pixel and the center pixel each are the saturation pixel, or a 3rd pixel and the center pixel each are the saturation pixel, or the 2nd pixel, the 3rd pixel and the 4th pixel each are the saturation pixel, or the 2nd pixel, the 4th pixel and the 7th pixel each are the saturation pixel, or the 2nd pixel, the 3rd pixel, the 4th pixel and the 7th pixel each are the saturation pixel, or the 1st pixel, the 4th pixel and the 8th pixel each are the saturation pixel, or the 1st pixel, the 4th pixel, the 8th pixel and a 9th pixel each are the saturation pixel, or the 4th pixel, the 8th pixel and the 9th pixel ear are the saturation pixel, or the 1st pixel, the center pixel and the 6th pixel each are the saturation pixel, performing the filtering processing on the center pixel in the nine-palace pixel block based on the RGBW data by using an expression 2 as follows:

$$P5\_C=0*C4+\frac{1}{2}*C5+\frac{1}{2}*C6$$

where P5_C represents C data of the center pixel after being processed by the first filtering method, C4 represents C data corresponding to the 4th pixel not being processed by the first filtering method, C5 represents C data corresponding to the center pixel not being processed by the first filtering method, C6 represents C data corresponding to the 6th pixel not being processed by the first filtering method, and the C data is one of RGBW data.

In another embodiment, the first filtering method includes: in the nine-palace pixel block, if a 2nd pixel and a 6th pixel each are the saturation pixel, or the 6th pixel and an 8th pixel each are the saturation pixel, or the 6th pixel, a 7th pixel and the 8th pixel each are the saturation pixel, or a 3rd pixel, the 6th pixel and the 8th pixel each are the saturation pixel, or a 1st pixel, the 2nd pixel, the 6th pixel and a 9th pixel each are the saturation pixel, or the 3rd pixel, the 6th pixel, the 7th pixel and the 8th pixel each are the saturation pixel, or the 2nd pixel, the 6th pixel and the 9th pixel each are the saturation pixel, or the 1st pixel, the 2nd pixel and the 6th pixel each are the saturation pixel, performing the filtering processing on the center pixel in the nine-palace pixel block based on the RGBW data by using an expression 3 as follows:

$$P5\_C=0*C4+0*C5+1*C6$$

where P5_C represents C data corresponding to the center pixel after being processed by the first filtering method, C4 represents C data corresponding to a 4th pixel in the nine-palace pixel block not being processed by the first filtering method, C5 represents C data corresponding to the center pixel not being processed by the first filtering method, C6 represents C data corresponding to the 6th pixel not being processed by the first filtering method, and the C data is one of RGBW data.

In still another embodiment, the first filtering method includes: in the nine-palace pixel block, if a 1st pixel, the center pixel and a 9th pixel each are the saturation pixel, or a 3rd pixel, the center pixel and a 7th pixel each are the saturation pixel, or the 3rd pixel, a 4th pixel and the center pixel each are the saturation pixel, or a 2nd pixel, the center pixel and the 7th pixel each are the saturation pixel, or the 2nd pixel, the center pixel and the 9th pixel each are the saturation pixel, or the 1st pixel, the center pixel and an 8th pixel each are the saturation pixel, or the 3rd pixel, the center pixel and the 8th pixel each are the saturation pixel, or the 4th pixel, the center pixel and the 9th pixel each are the saturation pixel, performing the filtering processing on the center pixel in the nine-palace pixel block by using an expression 4 as follows:

$$P5\_C=0*C4+1*C5+0*C6$$

where P5_C represents C data corresponding to the center pixel after being processed by the first filtering method, C4 represents C data corresponding to the 4th pixel not being processed by the first filtering method, C5 represents C data corresponding to the center pixel not being processed by the first filtering method, C6 represents C data corresponding to a 6th pixel in the nine-palace pixel block not being processed by the first filtering method, and the C data is one of RGBW data.

In an embodiment, the second filtering method includes: if the nine-palace pixel block does not contain the saturation pixel, performing the filtering processing on the center pixel in the nine-palace pixel block based on the RGBW data by using an expression 5 as follows:

$$P5\_C=\tfrac{1}{8}*C2+\tfrac{1}{8}*C4+\tfrac{1}{16}*C5+\tfrac{1}{8}*C6+\tfrac{1}{8}*C8+\tfrac{1}{4}*C5-\tfrac{1}{16}*(C1+C3+C7+C9)$$

where P5_C represents C data of the center pixel after being processed by the second filtering method, C4 represents C data corresponding to a 4th pixel in the nine-palace pixel block not being processed by the second filtering method, C5 represents C data corresponding to the center pixel not being processed by the second filtering method, C6 represents C data corresponding to a 6th pixel in the nine-palace pixel block not being processed by the second filtering method, C8 represents C data corresponding to an 8th pixel in the nine-palace pixel block not being processed by the second filtering method, C1 represents C data corresponding to a 1st pixel in the nine-palace pixel block not being processed by the second filtering method, C3 represents C data corresponding to a 3rd pixel in the nine-palace pixel block not being processed by the second filtering method, C7 represents C data corresponding to a 7th pixel in the nine-palace pixel block not being processed by the second filtering method, C9 represents C data corresponding to a 9th pixel in the nine-palace pixel block not being processed by the second filtering method, and the C data is one of RGBW data.

The method of sub-pixel compensation coloring of a RGBW display device based on edge pixel detection of the invention may make the RGBW display device with a low resolution to utilize high-resolution RGB data for displaying and can effectively eliminate color aliasing phenomenon.

BRIEF DESCRIPTION OF THE DRAWINGS

The above and other aspects, features and advantages of embodiments of the invention will be more apparent from the following detailed description taken in conjunction with the accompanying drawings, in which.

DETAILED DESCRIPTION OF EMBODIMENTS

In the following, various embodiments of the invention will be described in detail with reference to accompanying drawings. The invention may be embodied in many different forms and should not be construed as limiting to the embodiments set forth herein. Rather, these embodiments are provided to explain the principles of the invention and its practical applications, so that other skilled in the art can understand various embodiments of the invention and various modifications suitable for specific intended applications.

The invention provides a method of sub-pixel compensation coloring of a RGBW display device based on edge pixel detection. The display device (e.g., liquid crystal display device or organic light emitting diode display device) with a low resolution can utilize input high-resolution RGB data to display.

Figure 1:
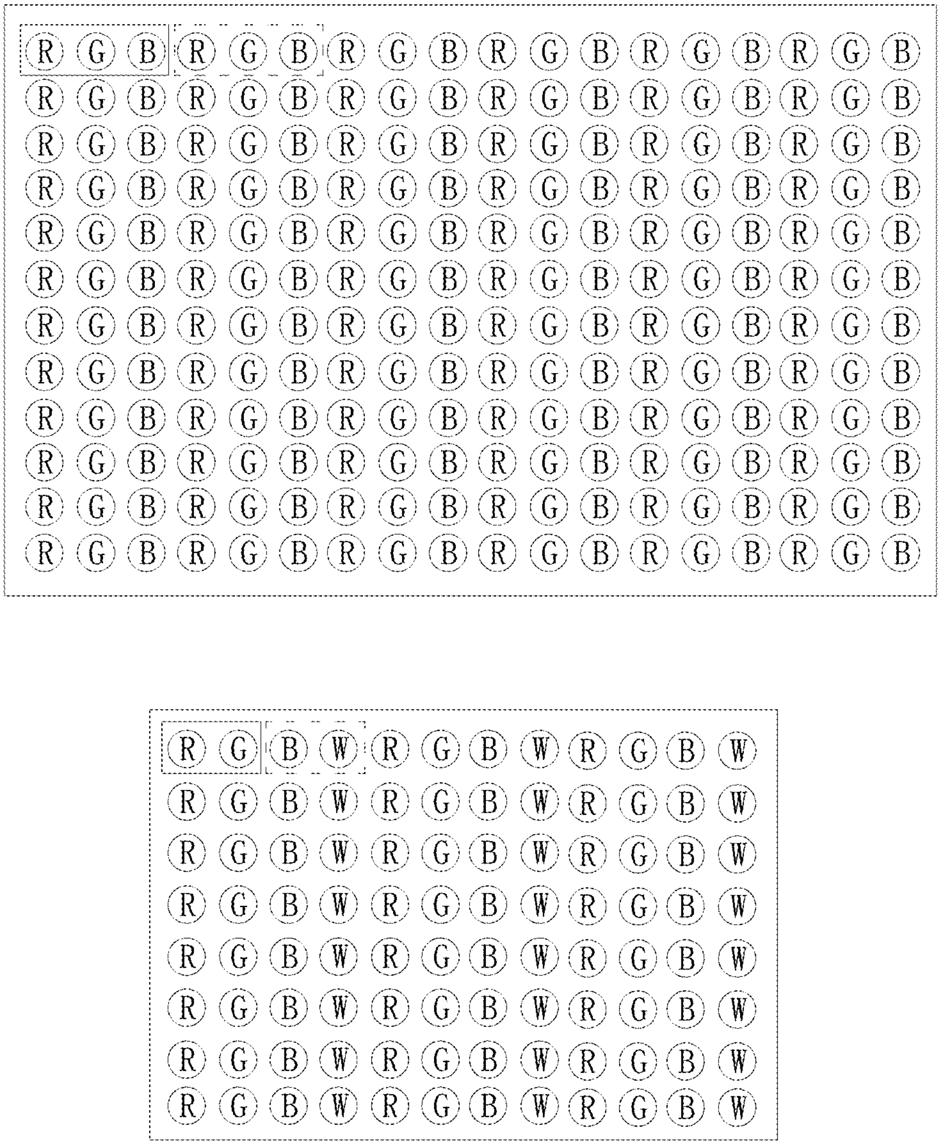
FIG. 1 is a schematic view of an arrangement of sub-pixels of a RGBW display device with a low resolution according to the invention and an arrangement of sub-pixels of a RGB display device with a high resolution for comparison.

FIG. 1 is a schematic view of an arrangement of sub-pixels (RGBW sub-pixels) of a RGBW display device with a low resolution according to the invention and an arrangement of sub-pixels (RGB sub-pixels) of a RGB display device with a high resolution for comparison. The resolution of the RGB display device is the same as the resolution of the input RGB data.

Referring to FIG. 1, in this invention, each RG sub-pixels and each BW sub-pixels of the RGBW display device respectively are corresponding to RGB sub-pixels at corresponding positions of the RGB display device, for example, the RG sub-pixels circled by the solid-line box are corresponding to the RGB sub-pixels circled by the solid-line box, the BW sub-pixels circled by the dashed-line box are corresponding to the RGB sub-pixels circled by the dashed-line box. Herein, the corresponding relationships also can be understood as that: the RG sub-pixels circled by the solid-line box are corresponding to RGB data used by the RGB sub-pixels circled by the solid-line box and also are corresponding to RGBW data converted from the RGB data; and the BW sub-pixels circled by the dashed-line box are corresponding to RGB data used by the RGB sub-pixels circled by the dashed-line box and also are corresponding to RGBW data converted from the RGB data.

Figure 2:
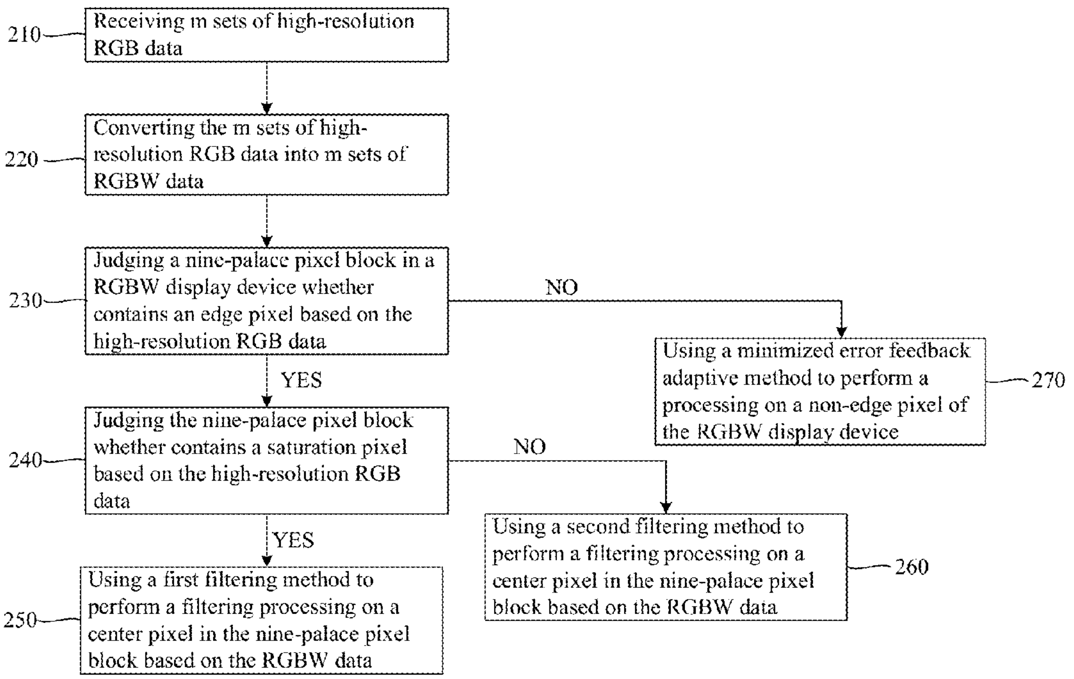
FIG. 2 is a flowchart of a method of sub-pixel compensation coloring of a RGBW display device based on edge pixel detection according to an embodiment of the invention.

FIG. 2 is a flowchart of a method of sub-pixel compensation coloring of a RGBW display device based on edge pixel detection according to an embodiment of the invention.

Referring to FIG. 1 and FIG. 2, in the operation of 210, m sets of high-resolution RGB data are received, and m is a positive integer. In this embodiment, each set of RGB data may include a red (R) luminance value, a green (G) luminance value and a blue (B) luminance value.

In the operation of 220, the m sets of high-resolution RGB data are converted into m sets of RGBW data. Herein, each set of RGBW data may for example include a red (R) luminance value, a green (G) luminance value, a blue (B) luminance value and a white (W) luminance value. As stated above, the RG sub-pixels circled by the solid-line box are corresponding to the RGB data used by the RGB sub-pixels circled by the solid-line box and also are corresponding to the RGBW data converted from the RGB data, the BW sub-pixels circled by the dashed-line box are corresponding to the RGB data used by the RGB sub-pixels circled by the dashed-line box and also are corresponding to the RGBW data converted from the RGB data. That is, the RGBW display device has m/2 sets of pixels, and any one set of the m/2 sets of pixels includes RG sub-pixels and BW sub-pixels.

Figure 3:
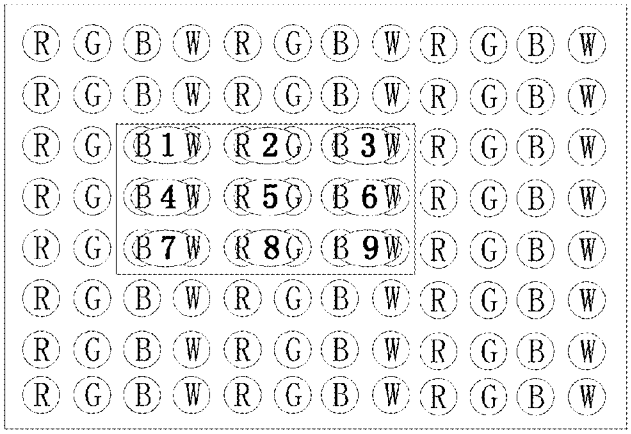
FIG. 3 is a schematic view of dividing a nine-palace pixel block of a RGBW display device according to an embodiment of the invention.

In the operation of 230, a nine-palace pixel block of the RGBW display device is judged whether includes an edge pixel based on the high-resolution RGB data. The division of the nine-palace pixel block is shown in FIG. 3, and as seen from FIG. 3, the nine-palace pixel block includes nine pixels, i.e., a 1st pixel, a 2nd pixel, a 3rd pixel, a 4th pixel, a 5th pixel (center pixel), a 6th pixel, a 7th pixel, a 8th pixel and a 9th pixel, and each of the nine pixels includes RG sub-pixels or BW sub-pixels.

Herein, a concrete method of judging a nine-palace pixel block of the RGBW display device whether includes an edge pixel based on the high-resolution RGB data includes:

calculating a matrix luminance of any one pixel in the nine-palace pixel block based on Sobel operators in four directions and the high-resolution RGB data; in particular, an expression 1 is used to calculate the matrix luminance of any one pixel in the nine-palace pixel block based on the Sobel operations in four directions.

$$L_n=S_d*(rgb) \quad \text{[Expression 1]}$$

where $S_d$ represents a Sobel operator in a direction of d, d represents an angle and d may be 0°, 45°, 90° and 135°; r represents R data corresponding to an nth pixel in the nine-palace pixel block, g represents G data corresponding to the nth pixel in the nine-palace pixel block, b represents B data corresponding to the nth pixel in the nine-palace pixel block, $L_n$ represents the matrix luminance of the nth pixel in the nine-palace pixel block;

determining a maximum matrix luminance; in particular, the maximum matrix luminance in the matrix luminances of all pixels in the nine-palace pixel block is determined.

judging the maximum matrix luminance whether is greater than a predetermined threshold;

if the maximum matrix luminance is greater than the predetermined threshold, a pixel in the nine-palace pixel block corresponding to the maximum matrix luminance being the edge pixel.

If the nine-palace pixel block includes the edge pixel, goes to the operation of 240. In the operation of 240, the nine-palace pixel block is judged whether includes a saturation pixel based on the high-resolution RGB data.

Herein, a concrete method of judging the nine-palace pixel block whether includes a saturation pixel based on the high-resolution RGB data includes steps of:

determining a maximum data value and a minimum data value in the RGB data corresponding to any one pixel in the nine-palace pixel block;

dividing the maximum data value by the minimum data value to obtain a data ratio;

judging the data ratio whether is less than a predetermined threshold;

if the data ratio is not less than the predetermined threshold, a pixel in the nine-palace pixel block corresponding to the data ratio is the saturation pixel.

If the nine-palace pixel block includes the saturation pixel, goes to the operation of 250. In the operation of 250, a first filtering method is used to perform a filtering processing on a center pixel (i.e., the 5th pixel) in the nine-palace based on the RGBW data.

Herein, the first filtering method may be different according to different positions of saturation pixel in the nine-palace pixel block.

Specifically, in the nine-palace pixel block, if the center pixel is the saturation pixel, or the 2nd pixel is the saturation pixel, or the 6th pixel is the saturation pixel, or the 8th pixel is the saturation pixel, or the 4th pixel is the saturation pixel, or the 4th pixel and the 8th pixel each are the saturation pixel, or the 2nd pixel and the 4th pixel each are the saturation pixel, or the center pixel and the 7th pixel each are the saturation pixel, or the 1st pixel and the center pixel each are the saturation pixel, or the 3rd pixel and the center pixel each are the saturation pixel, or the 2nd pixel, the 3rd pixel and the 4th pixel each are the saturation pixel, or the 2nd pixel, the 4th pixel and the 7th pixel each are the saturation pixel, or the 2nd pixel, the 3rd pixel, the 4th pixel and the 7th pixel each are the saturation pixel, or the 1st pixel, the 4th pixel and the 8th pixel each are the saturation pixel, or the 1st pixel, the 4th pixel, the 8th pixel and the 9th pixel each are the saturation pixel, or the 4th pixel, the 8th pixel and the 9th pixel each are the saturation pixel, or the 1st pixel, the center pixel and the 6th pixel each are the saturation pixel, the first filtering method performs the filtering processing on the center pixel in the nine-palace pixel block based on the RGBW data by using an expression 2.

$$P5\_C=0*C4+½*C5+½*C6 \quad \text{[Expression 2]}$$

where P5_C represents C data of the center pixel after being processed by the first filtering method, C4 represents C data corresponding to the 4th pixel not being processed by the first filtering method, C5 represents C data corresponding to the center pixel not being processed by the first filtering method, C6 represents C data corresponding to the 6th pixel not being processed by the first filtering method, and the C data is one of RGBW data (e.g., R data, G data, B data or W data).

In the nine-palace pixel block, if the 2nd pixel and the 6th pixel each are the saturation pixel, or the 6th pixel and the 8th pixel each are the saturation pixel, or the 6th pixel, the 7th pixel and the 8th pixel each are the saturation pixel, or the 3rd pixel, the 6th pixel and the 8th pixel each are the saturation pixel, or the 1st pixel, the 2nd pixel, the 6th pixel and the 9th pixel each are the saturation pixel, or the 3rd pixel, the 6th pixel, the 7th pixel and the 8th pixel each are the saturation pixel, or the 2nd pixel, the 6th pixel and the 9th pixel each are the saturation pixel, or the 1st pixel, the 2nd pixel and the 6th pixel each are the saturation pixel, the first filtering method performs the filtering processing on the center pixel in the nine-palace pixel block based on the RGBW data by using an expression 3.

$$P5\_C=0*C4+0*C5+1*C6 \quad \text{[Expression 3]}$$

where P5_C represents C data of the center pixel after being processed by the first filtering method, C4 represents C data corresponding to the 4th pixel not being processed by the first filtering method, C5 represents C data corresponding to the center pixel not being processed by the first filtering method, C6 represents C data corresponding to the 6th pixel not being processed by the first filtering method, and the C data is one of RGBW data.

In the nine-palace pixel block, if the 1st pixel, the center pixel and the 9th pixel each are the saturation pixel, or the 3rd pixel, the center pixel and the 7th pixel each are the saturation pixel, or the 3rd pixel, the 4th pixel and the center pixel each are the saturation pixel, or the 2nd pixel, the center pixel and the 7th pixel each are the saturation pixel, or the 2nd pixel, center pixel and the 9th pixel each are the saturation pixel, or the 1st pixel, the center pixel and the 8th pixel each are the saturation pixel, or the 3rd pixel, the center pixel and the 8th pixel each are the saturation pixel, or the 4th pixel, the center pixel and the 9th pixel each are the saturation pixel, the first filtering method performs the filtering processing on the center pixel in the nine-palace pixel block based on the RGBW data by using an expression 4.

$$P5\_C=0*C4+1*C5+0*C6 \quad \text{[Expression 4]}$$

where P5_C represents C data of the center pixel after being processed by the first filtering method, C4 represents C data corresponding to the 4th pixel not being processed by the first filtering method, C5 represents C data corresponding to the center pixel not being processed by the first filtering method, C6 represents C data corresponding to the 6th pixel not being processed by the first filtering method, and the C data is one of RGBW data.

If the nine-palace pixel block does not include the saturation pixel, goes to the operation of 260. In the operation of 260, a second filter method is used to perform a filtering processing on the center pixel in the nine-palace pixel block based on the RGBW data.

In particular, if the nine-palace pixel block does not include saturation pixel, the second filtering method (i.e., using a diamond filter and a Gauss difference filter) to perform the filtering processing on the center pixel in the nine-palace pixel block based on the RGBW data by an expression 5.

$$P5\_C=P5\_C1+P5\_C2$$

$$P5\_C1=\tfrac{1}{8}*C2+\tfrac{1}{8}*C4+\tfrac{1}{16}*C5+\tfrac{1}{8}*C6+\tfrac{1}{8}*C8$$

$$P5\_C2=\tfrac{1}{4}*C5-\tfrac{1}{16}*(C1+C3+C7+C9) \quad \text{[Expression 5]}$$

where P5_C represents C data of the center pixel after being processed by the second filtering method, C4 represents C data corresponding to the 4th pixel not being processed by the second filtering method, C5 represents C data of the center pixel not being processed by the second filtering method, C6 represents C data of the 6th pixel not being processed by the second filtering method, C8 represents C data of the 8th pixel not being processed by the second filtering method, C1 represents C data of the 1st pixel not being processed by the second filtering method, C3 represents C data of the 3rd pixel not being processed by the second filtering method, C7 represents C data of the 7th pixel not being processed by the second filtering method, C9 represents C data of the 9th pixel not being processed by the second filtering method, and the C data is one of RGBW data.

If the nine-palace pixel block does not include the edge pixel, goes to the operation 270. In the operation of 270, a minimized error feedback adaptive method is used to perform a processing on a non-edge pixel of the RGBW display device.

Figure 4:
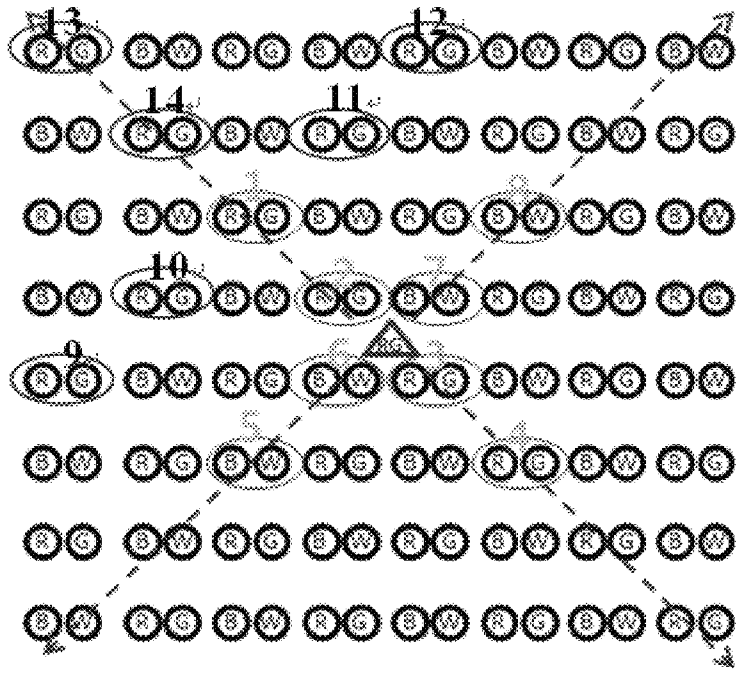
FIG. 4 is a schematic view of using a minimized error feedback adaptive method to perform a processing on a non-edge pixel of a RGBW display device according to an embodiment of the invention.

Because the minimized error feedback adaptive method is a method of prior art, and thus only a brief description is given herein. FIG. 4 is a schematic view of using a minimized error feedback adaptive method to perform a processing on a non-edge pixel of a RGBW display device according to an embodiment of the invention. In order to reduce hardware resources, an error feedback calculation only is performed in two directions of 45° and 135°, and the R sub-pixel of the pixel 2 (including RG sub-pixels) in FIG. 4 is taken as an example.

Firstly, predicted theoretical values (α1, α2, α3, α4 are Bicubic interpolation coefficients) of the to-be-calculated point in the two directions of 45° and 135° are that: R45=α1R5+α2R6+α3R7+α4R8, where R5, R6, R7, R8 respectively are R data of RGBW data corresponding to the positions of pixel 5, pixel 6, pixel 7, pixel 8 in FIG. 4; R135=α1R1+α2R2+α3R3+α4R4, where R1, R2, R3, R4 respectively are R data of RGBW data corresponding to the positions of pixel 1, pixel 2, pixel 3, pixel 4 in FIG. 4.

Subsequently, predicted theoretical values in the two directions of 45° and 135° for each of the pixels 1 to 8 are calculated as that: R1_pre45, R2_pre45, R3_pre45, R4_pre45, R5_pre45, R6_pre45, R7_pre45, R8_pre45, R1_pre135, R2_pre135, R3_pre135, R4_pre135, R5_pre135, R6_pre135, R7_pre135, R8_pre135. For example, R1_pre45=α1R9+α2R10+α3R11+α4R12, R1_pre135=α1R13+α2R14+α3R2+α4R3.

Afterwards, predicated error values in the two directions of 45° and 135° for each of the pixels 1 to 8 are calculated as that: R1_err45, R2_err45, . . . ; R1_err135, R2_err135, . . . .

R1_err45=R1_R1_pre45, R2 err45=R2−R2_pre45, . . . ; R1_err135=R1−R1_pre135, R2_err135=R2−R2_pre135, . . . .

Then, the predicated error values in the two directions of 45° and 135° are summed as follows:

Sum_err45=|R1_err45|+|R2_err45|+|R3_err45|+ . . . +|R8_err45|

Sum_err135−|R1_err135|+|R2_err135|+|R3_err135|+ . . . +|R8_err135|

Then, weight allocation coefficients in the two directions of 45° and 135° are calculated as follows:

K45=Sum_err135/(Sum_err45+Sum_err135)

K135=Sum_err45/(Sum_err45+Sum_err135)

Then, the weight allocation coefficients are multiplied by the predicated theoretical values of respective directions to calculate out the R data R2 of the R sub-pixel of the pixel 2, that is: R2=K45*R45+K135*R135.

Finally, the R data R2 of the R sub-pixel of the pixel 2 is mapped to the physical position of the R sub-pixel of the pixel 2 in FIG. 4.

The RGBW display device uses the processed m sets of RGBW data to display. Herein, the processed m sets of RGBW data include the RGBW data processed by the first filtering method, the RGBW data processed by the second filtering method, and the RGBW data processed by the minimized error feedback adaptive method.

In summary, the method of sub-pixel compensation coloring of a RGBW display device based on edge pixel detection according to the above embodiment of the invention can make the RGBW display device with a low resolution to utilize high-resolution RGB data for displaying and can effectively eliminate color aliasing phenomenon.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method of sub-pixel compensation coloring of a RGBW display device based on edge pixel detection, RG sub-pixels and BW sub-pixels of the RGBW display device each being corresponding to a set of high-resolution RGB data; the method comprising:

receiving m sets of high-resolution RGB data, wherein m is a positive integer;

converting the m sets of high-resolution RGB data into m sets of RGBW data, wherein RG sub-pixels and BW sub-pixels of the RGBW display device each are corresponding to one of the m sets of the RGBW data;

processing the m sets of RGBW data to obtain processed m sets of RGBW data, wherein processing the m sets of RGBW data comprises steps of:

judging a nine-palace pixel block of the RGBW display device whether contains an edge pixel based on the high-resolution RGB data, wherein the nine-palace pixel block comprises nine pixels each of which comprises the RG sub-pixels or the BW sub-pixels;

if the nine-palace pixel block contains the edge pixel, further judging the nine-palace pixel block whether contains a saturation pixel based on the high-resolution RGB data;

if the nine-palace pixel block contains the saturation pixel, using a first filtering method to perform a filtering processing on a center pixel in the nine-palace pixel block based on the RGBW data;

using the processed m sets of RGBW data to display by the RGBW display device;

wherein the step of judging a nine-palace pixel block of the RGBW display device whether contains an edge pixel based on the high-resolution RGB data comprises:

calculating a matrix luminance of each of the nine pixels in the nine-palace pixel block based on Sobel operators in several directions and the high-resolution RGB data;

determining a maximum matrix luminance of the matrix luminances of the nine pixels in the nine-palace pixel block;

judging the maximum matrix luminance whether is greater than a first predetermined threshold; and if the maximum matrix luminance is greater than the first predetermined threshold, the pixel in the nine-palace pixel block corresponding to the maximum matrix luminance is the edge pixel;

wherein the step of further judging the nine-palace pixel block whether contains a saturation pixel based on the high-resolution RGB data comprises:

determining a maximum data value and a minimum data value in the RGB data corresponding to any one of the nine pixels in the nine-palace pixel block;

dividing the maximum data value by the minimum data value to obtain a data ratio;

judging the data ratio whether is less than a second predetermined threshold; and if the data ratio is not less than the second predetermined threshold, the pixel in the nine-palace pixel block corresponding to the data ratio is the saturation pixel.

2. The method as claimed in claim 1, wherein processing the m sets of RGBW data further comprises steps of: if the nine-palace pixel block does not contain the edge pixel, using a minimized error feedback adaptive method to perform a processing on a non-edge pixel of the RGBW display device based on the RGBW data.

3. The method as claimed in claim 1, wherein processing the m sets of RGBW data further comprises steps of: if the nine-palace pixel block does not contain the saturation pixel, using a second filtering method to perform a filtering processing on the center pixel in the nine-palace pixel block based on the RGBW data.

4. The method as claimed in claim 1, wherein the matrix luminance of each of the nine pixels in the nine-palace pixel block is calculated based on the Sobel operators in several directions and the high-resolution RGB data by using an expression 1 as follows:

$$L_n=S_d*(rgb)$$

where $L_n$ represents a matrix luminance value of an nth pixel in the nine-palace pixel block, $S_d$ represent one of the Sobel operators in a direction d of the several directions, d represents an angle, r represents R data corresponding to the nth pixel in the nine-palace pixel block, g represent G data corresponding to the nth pixel in the nine-palace pixel block, and b represents B data corresponding to the nth pixel in the nine-palace pixel block.

5. The method as claimed in claim 1, wherein the first filtering method comprises:

in the nine-palace pixel block, if the center pixel is the saturation pixel, or a 2nd pixel is the saturation pixel, or a 6th pixel is the saturation pixel, or an 8th pixel is the saturation pixel, or a 4th pixel is the saturation pixel, or the 4th pixel and the 8th pixel each are the saturation pixel, or the 2nd pixel and the 4th pixel each are the saturation pixel, or the center pixel and a 7th pixel each are the saturation pixel, or a 1st pixel and the center pixel each are the saturation pixel, or a 3d pixel and the center pixel each are the saturation pixel, or the 2nd pixel, the 3rd pixel and the 4th pixel each are the saturation pixel, or the 2nd pixel, the 4th pixel and the 7th pixel each are the saturation pixel, or the 2nd pixel, the 3rd pixel, the 4th pixel and the 7th pixel each are the saturation pixel, or the 1st pixel, the 4th pixel and the 8th pixel each are the saturation pixel, or the 1st pixel, the 4th pixel, the 8th pixel and a 9th pixel each are the saturation pixel, or the 4th pixel, the 8th pixel and the 9th pixel ear are the saturation pixel, or the 1st pixel, the center pixel and the 6th pixel each are the saturation pixel, performing the filtering processing on the center pixel in the nine-palace pixel block based on the RGBW data by using an expression 2 as follows:

$$P5\_C=0*C4+\frac{1}{2}*C5+\frac{1}{2}*C6$$

where P5_C represents C data of the center pixel after being processed by the first filtering method, C4 represents C data corresponding to the 4th pixel not being processed by the first filtering method, C5 represents C data corresponding to the center pixel not being processed by the first filtering method, C6 represents C data corresponding to the 6th pixel not being processed by the first filtering method, and the C data is one of RGBW data.

6. The method as claimed in claim 1, wherein the first filtering method comprises:

in the nine-palace pixel block, if a 2nd pixel and a 6th pixel each are the saturation pixel, or the 6th pixel and an 8th pixel each are the saturation pixel, or the 6th pixel, a 7th pixel and the 8th pixel each are the saturation pixel, or a 3rd pixel, the 6th pixel and the 8th pixel each are the saturation pixel, or a 1st pixel, the 2nd pixel, the 6th pixel and a 9th pixel each are the saturation pixel, or the 3rd pixel, the 6th pixel, the 7th pixel and the 8th pixel each are the saturation pixel, or the 2nd pixel, the 6th pixel and the 9th pixel each are the saturation pixel, or the 1st pixel, the 2nd pixel and the 6th pixel each are the saturation pixel, performing the filtering processing on the center pixel in the nine-palace pixel block based on the RGBW data by using an expression 3 as follows:

$$P5\_C=0*C4+0*C5+1*C6$$

where P5_C represents C data corresponding to the center pixel after being processed by the first filtering method, C4 represents C data corresponding to a 4th pixel in the nine-palace pixel block not being processed by the first filtering method, C5 represents C data corresponding to the center pixel not being processed by the first filtering method, C6 represents C data corresponding to the 6th pixel not being processed by the first filtering method, and the C data is one of RGBW data.

7. The method as claimed in claim 1, wherein the first filtering method comprises:

in the nine-palace pixel block, if a 1st pixel, the center pixel and a 9th pixel each are the saturation pixel, or a 3rd pixel, the center pixel and a 7th pixel each are the saturation pixel, or the 3rd pixel, a 4th pixel and the center pixel each are the saturation pixel, or a 2nd pixel, the center pixel and the 7th pixel each are the saturation pixel, or the 2nd pixel, the center pixel and the 9th pixel each are the saturation pixel, or the 1st pixel, the center pixel and an 8th pixel each are the saturation pixel, or the 3rd pixel, the center pixel and the 8th pixel each are the saturation pixel, or the 4th pixel, the center pixel and the 9th pixel each are the saturation pixel, performing the filtering processing on the center pixel in the nine-palace pixel block by using an expression 4 as follows:

$$P5\_C=0*C4+1*C5+0*C6$$

where P5_C represents C data corresponding to the center pixel after being processed by the first filtering method, C4 represents C data corresponding to the 4th pixel not being processed by the first filtering method, C5 represents C data corresponding to the center pixel not being processed by the first filtering method, C6 represents C data corresponding to a 6th pixel in the nine-palace pixel block not being processed by the first filtering method, and the C data is one of RGBW data.

8. The method as claimed in claim 3, wherein the second filtering method comprises:

if the nine-palace pixel block does not contain the saturation pixel, performing the filtering processing on the center pixel in the nine-palace pixel block based on the RGBW data by using an expression 5 as follows:

$$P5\_C=\frac{1}{8}*C2+\frac{1}{8}*C4+\frac{1}{16}*C5+\frac{1}{8}*C6+\frac{1}{8}*C8+\frac{1}{4}*C5-\frac{1}{16}*(C1+C3+C7+C9)$$

where P5_C represents C data of the center pixel after being processed by the second filtering method, C4 represents C data corresponding to a 4th pixel in the nine-palace pixel block not being processed by the second filtering method, C5 represents C data corresponding to the center pixel not being processed by the second filtering method, C6 represents C data corresponding to a 6th pixel in the nine-palace pixel block not being processed by the second filtering method, C8 represents C data corresponding to an 8th pixel in the nine-palace pixel block not being processed by the second filtering method, C1 represents C data corresponding to a 1st pixel in the nine-palace pixel block not being processed by the second filtering method, C3 represents C data corresponding to a 3rd pixel in the nine-palace pixel block not being processed by the second filtering method, C7 represents C data corresponding to a 7th pixel in the nine-palace pixel block not being processed by the second filtering method, C9 represents C data corresponding to a 9th pixel in the nine-palace pixel block not being processed by the second filtering method, and the C data is one of RGBW data.

* * * * *